United States Patent
Nicolai

[15] 3,700,308
[45] Oct. 24, 1972

[54] LIGHT POLARIZING PRISM OF ZIRCON

[72] Inventor: Van O. Nicolai, 11653 1B Northshore Drive, Reston, Va. 22070

[22] Filed: March 22, 1971

[21] Appl. No.: 126,729

[52] U.S. Cl. ................................350/157, 350/147
[51] Int. Cl. ............................................G02b 5/30
[58] Field of Search ............350/147, 157; 331/94.5

[56] References Cited

UNITED STATES PATENTS 3,577,097  5/1971  Hillberg.....................350/157
3,511,556  5/1970  Ammann....................350/157

OTHER PUBLICATIONS

Morgan et al., " Optical, Spectrographic and Radioactivity Studies of Zircon" Am. J. Sci. Vol. 239, No. 4 (April 1941) pp. 305–311

Merwin, " Refractivity of Birefringent Crystals" International Critical Tables, Vol. VII (1930) pp. 16–17 and 20 [ McGraw–Hill Co., N.Y.]

Shurcliff, Polarized Light, Chap. 5, " Birefringence Polarizers" pp. 65–77 (Harvard Univ. Press, Cambridge, Mass. 1962)

" Zircon," Encyclopedia Britannica Vol. 23 p. 957 (Chicago, 1957)

*Primary Examiner*—David Schonberg
*Assistant Examiner*—Paul R. Miller
*Attorney*—R. S. Sciascia, Arthur L. Branning and Philip Schneider

[57] ABSTRACT

A laser beam splitting polarizer is constructed of zircon. Zircon can give about a 90° spread between the ordinary and extraordinary rays and is rugged enough to withstand high powered laser beams.

1 Claim, 1 Drawing Figure

Patented Oct. 24, 1972
3,700,308
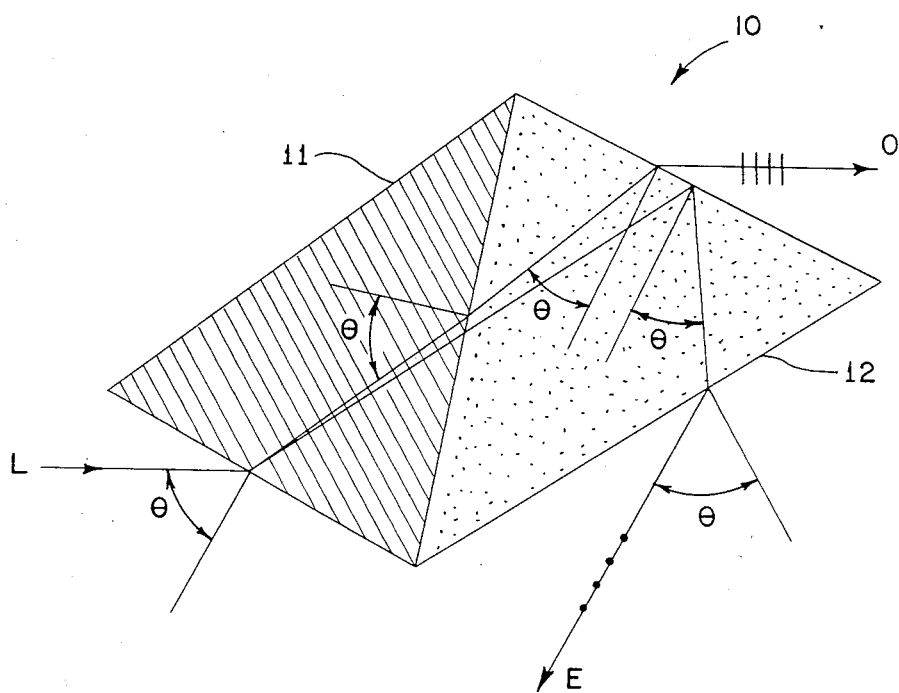
INVENTOR
VAN O. NICOLAI
AGENT
ATTORNEY

LIGHT POLARIZING PRISM OF ZIRCON

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention is concerned with optical polarizers and, more particularly, to an improved polarizing prism for high powered laser systems.

2. Description of the Prior Art

Conventional birefringent materials used in various types of optical polarizers are natural quartz and calcite or Iceland spar, chemically defined as calcium carbonate ($CaCO_3$). The increasing demands for calcite materials and the limited supplies of good quality stock, have caused the price of such prisms to soar.

In an effort to cut costs, various attempts have been made to conserve the amounts of minerals used in the various prisms by replacing sections of the prism with glass. Also, polarizers have been constructed with stacked plates of glass. These approaches have not met with success because of the small angular separation in quartz and the less than 100 percent polarization caused by the numerous plates of glass. Additionally, calcite prisms are easily damaged by the high powered laser systems frequently encountered with today's technology.

SUMMARY OF THE INVENTION

According to the present invention, a light polarizing prism of zircon is provided for use with high powered laser beams. There is enough birefringence in zircon to make a polarizer having an angular spread of about 90° between the ordinary and extraordinary rays. Additionally, zircon is classified as a gem stone material and is durable enough to withstand incident high energy laser beams.

OBJECTS OF THE INVENTION

It is, therefore, an object of the present invention to provide a novel light polarizing prism.

It is a further object of the present invention to provide a light polarizing prism which has enough birefringence to give an angular spread of about 90° between the ordinary and extraordinary rays.

It is a still further object of the present invention to provide a light polarizing prism which is rugged enough to withstand the incident beams from a high powered laser system.

Still other objects, features and attendant advantages of the present invention will become apparent to those skilled in the art from a reading of the following description of a preferred embodiment constructed in accordance therewith, taken in conjunction with the accompanying drawing wherein:

BRIEF DESCRIPTION OF THE DRAWING

The FIGURE is an orthographic top view of a light polarizing prism embodying the present invention.

DESCRIPTION OF A PREFERRED EMBODIMENT

When it is desired to split a light beam into two plane-polarized components for later intensity comparison, Rochon and Wollaston prisms are commonly utilized. These optical devices, sometimes called double-image prisms, are cut into two prism sections at predetermined angles inclined with respect to the direction of propagation of incident light. The sections may be cemented together or secured without cement through the well known process of optical contacting. In a Wollaston prism, the incident light enters normal to the surface and travels perpendicular to the optic axis of the first section until it strikes the second section where double refraction takes place. In a Rochon prism a similar action takes place except that the incident light normal to the surface travels along the optic axis rather than perpendicular to it. The Wollaston prism deviates both rays and consequently yields greater separation of the ordinary and extraordinary rays.

The FIGURE shows a modified Wollaston prism 10 constructed of zircon. Sections 11 and 12 consist of zircon and may be cemented together as described in U. S. Pat. No. 3,511,556 or, more preferably, secured by optical polishing of the mating surfaces as in the well known optical contacting process. Section 11 is cut so that its optic axis is in the plane of the paper and perpendicular to the extraordinary ray of light beam L. The angles $\theta$ are all at Brewster's angle so that there is no reflection. As it enters section 11 light beam L is doubly refracted and travels until it strikes section 12 where double refraction again takes place due to the predetermined angular alignment of the optic axes of section 12. As is known to those skilled in the art, a light beam is conventionally characterized as having two components — an ordinary ray O and an extraordinary ray E which are polarized perpendicular to each other. In the case of FIG. 1, the optic axis of section 12 is perpendicular to the plane of the paper to achieve total internal reflection of the extraordinary ray E and thus an angular divergence from the ordinary ray O of about 90°. This is readily accomplished because birefringent material in effect divides the light beam into O and E rays since the material has different indices of refraction for these rays. Zircon has an index of refraction for the ordinary ray ($N_o$) of about 1.931 and an index of refraction of about 1.988 for the extraordinary ray ($N_e$). The O ray is shown as being polarized perpendicular to the optic axis of section 12 and the E ray parallel thereto.

Zircon is known to exist naturally and can be made by hydrothermal crystal growth techniques. It is a hard diamond-like material in its pure form and is classified as a gem stone. As such, it is particularly suited for use as polarizers in solid Q-spoiled laser systems or in other high peak power systems.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device operating in conjunction with a high-powered laser for polarizing the light emanating therefrom, said device comprising:

a birefringent prism consisting essentially of pure zircon for separating said light into ordinary and extraordinary rays.

* * * * *